March 8, 1966  H. LUEDER  3,239,144
TEMPERATURE EQUALIZING BUILDING STRUCTURE
Filed May 9, 1963  3 Sheets-Sheet 2
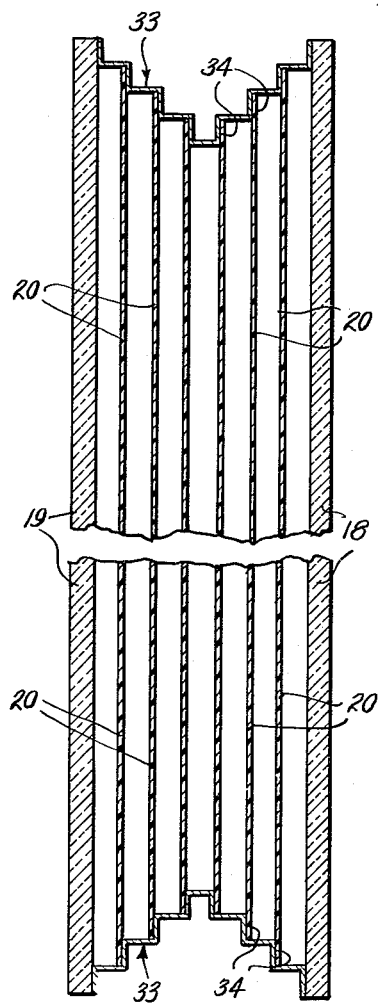
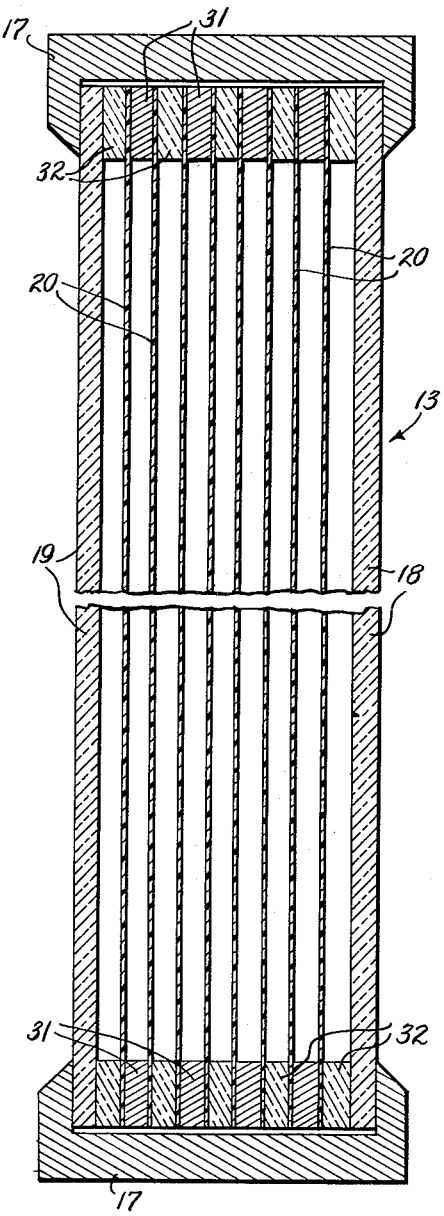
Fig.3.
Fig.2.
INVENTOR
Holger Lueder
BY Baron & Thomas
ATTORNEYS United States Patent Office 3,239,144
Patented Mar. 8, 1966

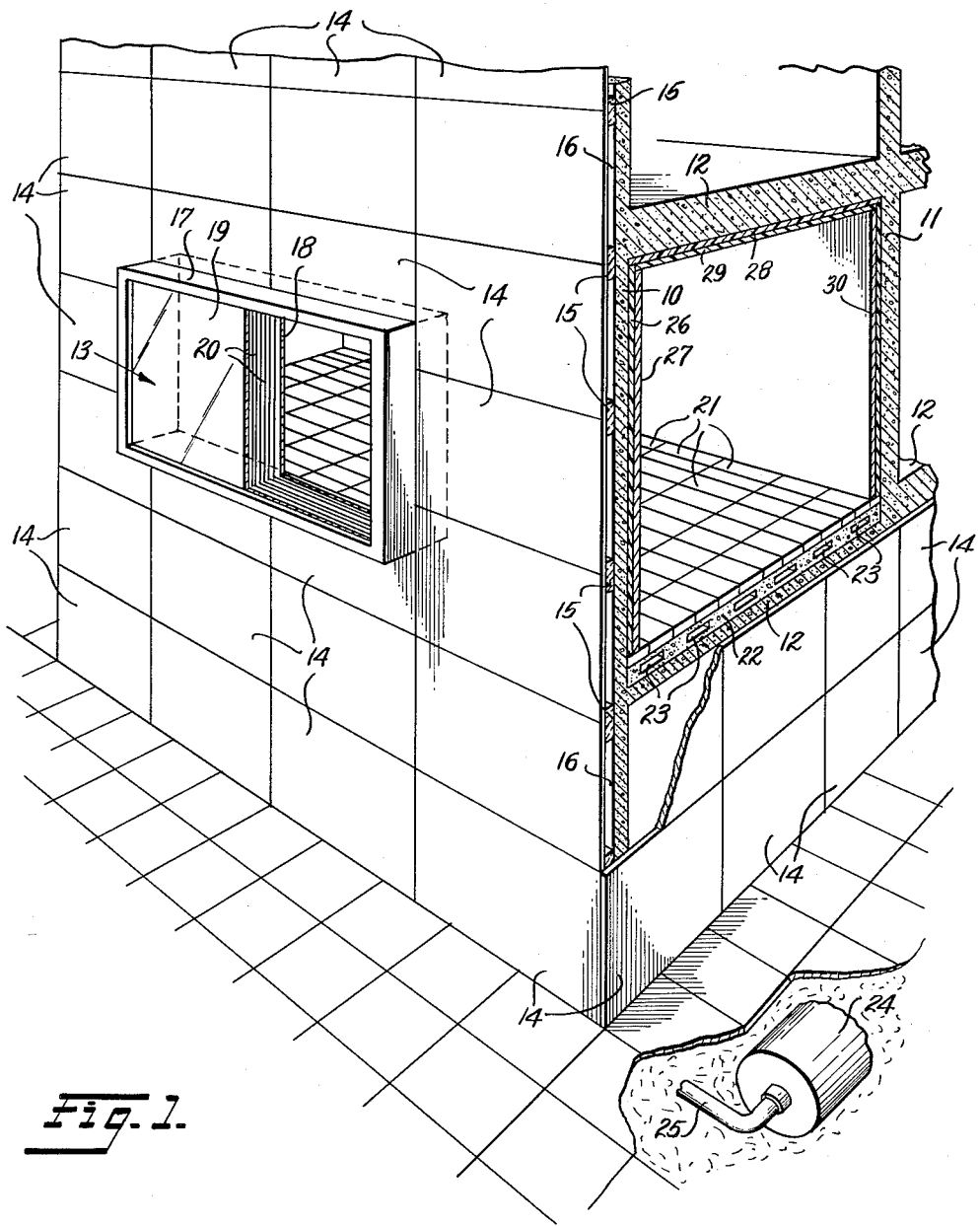

3,239,144
TEMPERATURE EQUALIZING BUILDING STRUCTURE
Holger Lueder, Winterthur, Switzerland, assignor to Friedr. Julius Maas, Zurich, Switzerland
Filed May 9, 1963, Ser. No. 279,282
3 Claims. (Cl. 237—1)

This is a continuation-in-part application of my pending application Serial No. 270,134, filed March 20, 1963 and now abandoned.

The present invention relates to a method for equalizing the day and night temperature in rooms which are partitioned off from their surroundings but provided with windows. Such rooms may be living and working rooms in buildings or greeneries or rooms inside vehicles and craft of all kinds. Furthermore the invention relates to a method for utilization of solar and sky radiations for the heating of such rooms as well as for storing of energy for the cooling of the said rooms.

It is one aspect of the invention that during winter time the heating energy for the said rooms is derived form solar and sky radiation in such amount that only a small additional heating must be provided.

It is well known in the building art that the consumption of heating and cooling energy in modern lightweight buildings increase with the saving of building materials and with the enlargement of the window areas. The lightweight design of buildings results in a loss in the thermal capacity and in the temperature equalizing effect which both are responsible for the comfortable surroundings in old-fashioned and solidly designed houses. The reasons for such deficiencies in modern structures are their high solar radiation transparency and the small thermal resistance of the double and compound windows as well as the fact that the buildings are not provided with thermal insulation against the surroundings which is effective for protection against undesirable cooling and heating.

The known double and compound windows offer such small resistance to solar light and heat losses that they are the main thermal leaks of each building. Also, the outside walls normally have a comparatively low thermal insulating quality and are quite effective as heat exchange surfaces for passage of the heat stored in the indoor regions of the building. This is particularly true in the case where such walls are provided with large windows or the like.

During summer time the rooms are heated during the day by direct solar radiation and the cooling during the night is not effective enough to fully compensate. In a room with windows directed to the east or west, during the later morning or the early afternoon, the persons, furniture, plants and walls upon which the sun shines are heated as much as they would be from a windowpane having a temperature of about 100° C. It is clear therefrom that plants in a greenery are burnt during the midsummer and that the rooms located at the sunny side and provided with large windows show an intolerable temperature if the heat generated by the solar and sky radiation is not carried away by an air conditioning system.

For each square meter of window area which is unfavorably directed and not shaded in large buildings, the costs for air conditioning installations are as high as about $30 to $100.

Also, if the air and/or the indoor walls of such a room are cooled, there is no redress for the unpleasant one-sided heating of a person's body by the solar radiation. A complete compensation of such heating from the entering solar radiation by means of cooling the room air would result in an uncomfortable draft. Hence it is practically impossible to eliminate the undesired influence of the solar radiation by a cooled air stream or by a radiation cooling. Attempts in such directions necessarily produce an excessive cooling of the part of the body turned away from the window, a fact well known to be prejudicial to health.

During winter time, the strong radiation of heat from a person's body toward a cold windowpane is perceived as a radiation draft. No more than about 10% of the thermal energy necessary for a comfortable room is used to heat the supplied fresh air. The main part of the remaining 90% escapes out through the window and is lost to the room. This part of the thermal energy serves only to establish a temperature drop across the window, which prevents the inside pane from getting too cold. Nevertheless the inside pane of a normal double or compound window is still too cold during a cold winter for comfortable occupation of the space directly beside the window.

The lack of thermal resistance of known windows and the absence of a thermal insulation of the indoor structure against the surroundings are responsible for the following deficiencies:

During winter time after interruption of the heating the rooms cool relatively rapidly, hence a continuous heating is necessary;

The energy of the solar and sky radiation entering through a window is retained only in a rather small amount in the indoor structure;

During summer time the equalization of day and night temperature is insufficient in modern buildings;

During summer time the indoor structure is heated in an undesired amount by the sun shining upon the outdoor walls;

Rooms for fabrication processes which demand a very uniform temperature distribution must be designed without windows.

The above-mentioned deficiencies may be overcome by increasing the storage capacity of indoor structures for the absorbed heat and transformed energy of the solar and sky radiation entering through the windows, as well as for the energy from an artificial heating or cooling source. The entry of solar and sky radiation can furnish the main part of the thermal energy demand during winter time and only a supplementary heating is necessary, for example an electrical heating system using cheap night current supply. During summer time often a sufficient cooling may be obtained solely with a fresh air flow during the night hours.

One aspect of the present invention is a method of developing the whole indoor structure as a thermal absorber and storage means for heat by connecting together, in a thermally conductive manner, all parts of the said structure. Furthermore, a corresponding connection having good thermal conductivity is made to those indoor walls which absorb radiations entering through the windows.

It is therefore an object of the invention to completely interrupt each and all thermally conducting connections from the indoor structure to the surroundings as well as to increase the thermal resistance of each area unit of the windows. Both measures in such manner that the thermal inertia, which is the product of the thermal resistance and the thermal capacity of the indoor structure, exceeds the value of about 10 hours.

Another object of the invention is to decrease the caloric conductivity of the windows relative to the transparency of the same and to use the solar and sky radiation for the heating of indoor rooms during the winter time.

A further object of the invention is the saving of energy used for cooling rooms during the summer time by reflecting back to the windows that amount of the entering solar and sky radiation which would effect an excessive illumination and heating of the room.

The invention will now be described referring to the accompanying drawing, wherein:

FIG. 1 shows a building, partly broken away, designed according to the principles of the present invention;

FIGS. 2 and 3 are vertical sections of two exemplary embodiments of compound windows according to the invention;

Figure 5:
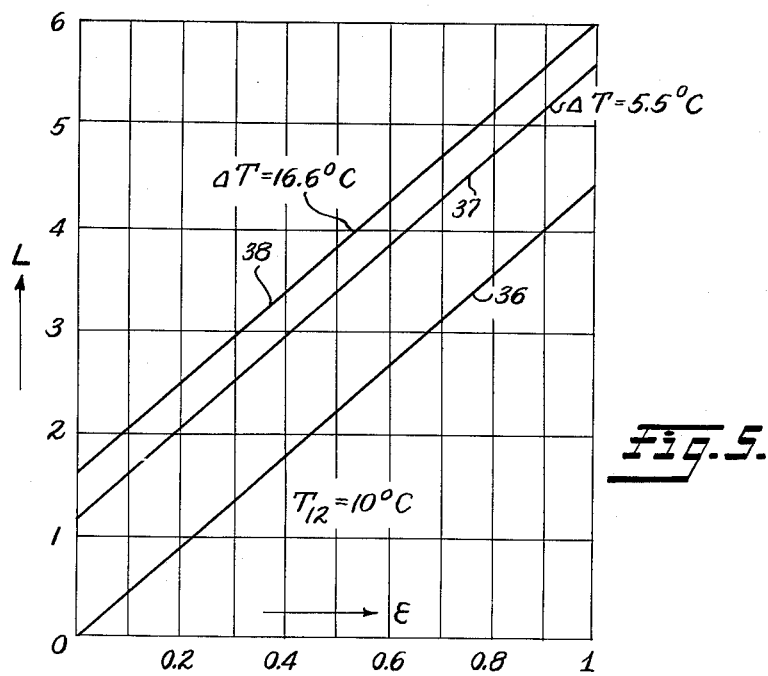
FIGS. 4 and 5 are two diagrams illustrating the effects of the compound windows of FIGS. 2 and 3.

The invention is described in detail with reference to the rooms of a building. It may be pointed out that the scope of the invention is in no means restricted to indoor rooms in buildings but is suitable for other indoor structures, for example in vehicles and crafts.

The indoor structures must be thermally disconnected from the surroundings, for example by means of a casing made of bright-drawn aluminum. The metal is preferably provided with an adhesive layer of amino modified Silan Ester being copolymerized with reactivate monomers, a material presently available in the market.

To construct an indoor structure of a steel frame building as a thermal absorbed and storage means for heat it is necessary to connect all parts of the steel skeleton and other metallic parts in a thermally conductive manner, preferably with metallic contacts between all parts. If the building has no steel frame, as in the form illustrated, all walls, ceiling and floor must be joined in good heat conducting relation. It is important to eliminate the hitherto used insulation layers between the skeleton and the indoor walls. The whole indoor structure must have such good thermal contact between all parts so that the temperature achieved by them during heat storage is substantially equal at all points. Nevertheless the whole indoor structure must be thermally insulated from the above-mentioned casing to ensure a thermal disconnection between the said indoor structure and the surroundings.

The thermal resistance of the windows is increased preferably by using a compound window. Such a compound window comprises a pair of spaced rigid panes and between the panes a sufficient number of thin plastic sheets permeable to solar and sky radiation. In one embodiment such a compound window, using frames with high thermal resistance made from polyester resin with glass fiber reinforcements, has a thermal resistance about five times higher than the thermal resistance of conventional double windows. The said windows provide a heat protection equal to brick walls about one meter thick and hence all handicaps owing to large window areas in modern designs are removed. On the other hand, the use of large window areas is advantageous also from the heating point of view because the solar and sky radiation supplies enough energy to be stored as thermal energy in the indoor structure, so that during winter time only a rather small supplementary quantity of heat need be supplied and could be furnished by a small electrical heating system or by electrical illumination of high enough intensity.

The solar and sky radiation may now be utilized as an energy source for the heating of indoor rooms in a much greater amount than before, if the covering of the whole indoor structure and the indoor walls are designed to absorb the impinging radiation.

The previously mentioned casing enclosing the whole indoor structure may consist completely or partly of compound windows of the described kind. Furthermore, if desired, some indoor rooms may be partitioned off from their surroundings using only the described compound windows.

In the case where free sight through all parts of the described compound windows is not desired, or if the whole window area is not used for room illumination, one or more of the plastic foils may be partly covered with a metallic layer not fully transparent. Also parts of the inner pane may be provided with such a layer, preferably at its surface which faces away from the room.

A casing for the indoor structure consisting completely of the described compound window is advantageous because the indoor structure is damproof against the surroundings and, in addition, moisture condensation on the inner window pane is avoided during winter time because of the higher temperature of that pane.

The plastic foils are stretched wrinkle-free in the space between the rigid panes of the compound window and insure that solar radiation is reflected in such a way that road traffic passing buildings with such casings is not disturbed by reflected light beams any more than by normal reflecting windows.

An embodiment of the described compound windows comprising 7 parallel extending polyester foils at a distance of 5 mm. between adjacent foils shows a decreasing of caloric conductivity relative to its transparency, of about 1:2.5. Using such a window in the outside wall of a test room, in which wall the window occupies only 15% of the whole area, the quantity of heating necessary to maintain an agreeable room temperature during the winter months of two years has been measured and compared with the demand for another test room with a normal double window but of the same size, in the same building and with its window in the same direction. The first mentioned test room using the window with decreased caloric conductivity demanded only 20 to 30% of the heating energy supplied to the second test room having the normal double window of the same area.

The results can be explained theoretically. It is assumed that $B_0$ is the energy of the solar and sky radiation entering through each square meter of the window and $(T_1 - T_a)$ is the temperature difference between the inner and the outer panes of the window, furthermore $\tau_\nu$ and $\alpha_\nu$ are the conductivities for solar radiation and heat, respectively, of the compound window comprising $\nu$ sheets. If the indoor room is partitioned or isolated from its surroundings only by such windows, the portion of the total heating demand being supplied by the solar and sky radiation is evaluated by the ratio of the solar and sky energy $B = B_0$ entering through one square meter of the window and the heat loss through the same area $Q = \alpha_\nu (_1 - T_a)$. The portion of utilized solar energy is increased with increasing ratio $T_\nu / \alpha$. Because most plastic foils of suitable transparency have an absorption in the wavelength range of radiant heat of about 300° Kelvin, the ratio $\tau_\nu / \alpha_\nu$ increases with an increasing number $(\nu - 2)$ of foils in the window. It is also advantageous to arrange the wrinkle-free stretched foils with an equal distance of at least 2 mm. between adjacent foils. Furthermore, it is desirable to fill the interspaces between the foils with a dry gas, preferably a gas having less thermal conductivity than air, for example, carbon dioxide. The foils may be made from a material having a refraction coefficient and/or an extinction coefficient of a higher value in the longer infra-red range than in the visible range of wavelengths. Hence it is desirable to provide both surfaces of the foils with a vapor-deposited layer of ¼ thickness which reduces the reflection factor for the impinging light.

Studies have been conducted for an indoor room having adiabatic walls and one window at the south side comprising 7 foils made from polyethylene-terephthalate between a pair of glass panes. The values of caloric and light conductivities have been measured. The evaluation has been carried out using the solar and sky radiation energies registered daily at Hamburg, Germany during the years 1952 to 1954, together with the daily mean values of the wind forces and the outside temperature. The result is that such a room, being located in middle geographic latitudes, demands 60 watts electrical heating energy per square meter of the window area during 8 night hours if the indoor structure exposed to the solar and sky radiation has a thermal capacity equal to that of a concrete floor 25 cm. thick. The total demand for supplementary heating energy per year has been evaluated as 12 to 24 kwh. per square meter of window area, corresponding to 120 to 240 kwh. for a window having a width of 4 m. and a height of 2.5 m. This demand is not more than 12 to 6% of the energy consumption for a normal room having a floor area of 20 square meters and heated by a hot water heating system with an oil burner. The demand of not more than 60 watts per square meter of window area is so small that it seems to be unprofitable to furnish each building with its own heating system. It would be more economical to provide an electrical heating system for supplementary energy which could be operated during the night hours with cheap current and the heat stored in the indoor structure which is insulated against thermal losses by the above described casing and the special compound windows.

To increase the thermal capacity of the indoor structure of lightweight buildings, it is possible to flag the floor with thick stones of high specific density and high thermal conductivity. The stone layer may be provided with an electric heating device. So designed, the floor has a high thermal conductivity and capacity, may be electrically heated with cheap night current to a temperature of 22° to 23° C. and will have a temperature drop of not more than 2.5° C. during the day hours.

It is also possible to increase the thermal capacity of the floor by a built-in system of tubes, filled with a fluid and connected to a large thermally insulated tank outside of the indoor structure. The fluid flowing through the tube system may be heated or cooled. Furthermore, the tube system may be filled with a medium such as $CCl_3F$ (trade name Freon 11) which is vaporized or condensed at a temperature between 18° and 24° C., as a function of the low pressure in the system. In this case the volume of the tank may be decreased according to the thermal capacity being gained by the vaporization and condensation. It is an advantage of such a system that the temperature of the floor is rather constant and the alterations of the room temperature between day and night are nearly equalized. Furthermore, a tube system without a tank may be used as a condenser or an evaporator of a reverse cycle heating system (so called heat pump) which delivers heat to or supplies heat from a second tube system arranged in the earth or provided with an air cooling device.

Increasing the thermal capacity by means of a tube system filled with 10 liters of fluid per square meter of floor area permits dissipation of solar energy stored as heat during a summer day by a fresh air stream passing through the room during the night hours. In these circumstances a test was conducted with the above described test room having a volume of 44 cubic meters and a floor area of 18 square meters; to achieve an agreeable temperature during a 9 hour work day it was only necessary to carry off a total of 3800 kcal. during the whole summer of 1960. According to calorimetric measurements using a so-called Schmid calorimeter connected to a compensation integrator instrument, the main portion of the heat (27500 kcal. during the whole summer) stored during the day in the floor—without an undesired temperature rise in the room—has been carried off with a fresh air stream during the night hours.

The different tests described above demonstrate the fact that the present invention permits a remarkable and unexpected saving of expenses for heating and for cooling as well as for the necessary installations.

The method according to the present invention is suitable for equalizing the day and night temperature in indoor rooms which are partitioned off from their surroundings but provide with windows, as well as for a better utilization of the solar and sky radiation to such rooms and for a remarkable saving of energy for the cooling of the same. The term indoor rooms is used in this description for living and working rooms in buildings as well as for rooms in greeneries or warehouses and production rooms. Furthermore, the term is also used for rooms in vehicles and crafts of all kinds like air conditioned railways, aircraft and space vehicles.

An embodiment of the invention is described below referring to FIG. 1 of the drawings which shows schematically a building and a room in it suitable for living and working purposes. The indoor structure of the building embodies the principles of the present invention.

The building has an outer wall 10 as well as indoor walls 11 and intermediate ceilings 12 all made of concrete or reinforced concrete. Good heat conducting contact is provided between all parts of the whole concrete indoor structure and to provide substantial heat holding capacity of the indoor structure.

The outdoor wall 10 is furnished with a compound window 13 which is shown partly broken away in FIG. 1 to facilitate the explanation of its design. Because the sun and sky radiation entering the window 13 impinges primarily on the back wall 11 and the floor 12, it is necessary to provide good thermal contact between the whole indoor structure and this back wall 11 as well as the floor 12. In cases where the back wall 11 and the intermediate ceilings 12 are provided with steel girders, it is of importance to provide a good thermal contact between all such steel parts.

The indoor structure comprising the walls 10 and 11 and the intermediate ceiling 12 is also thermally insulated from the outdoor surroundings. Hence the indoor structure is furnished with a covering made of slabs 14 fastened to thermal insulating spacers 15 carried by the concrete outdoor walls and defining an air interspace 16. The slabs 14, may be made of aluminum of the kind mentioned previously or may be of colored glass and form a complete and uninterrupted covering which is free of thermal conducting bridges to the indoor structure, this thermally insulating the structure quite efficiently.

The compound window 13 is provided with a frame 17 mounted with good joint packings and complete thermal insulation in the outdoor wall 10 and the covering of slabs 14. The compound window 13 comprises an inside pane 18 and an outside pane 19 and a plurality of transparent plastic foils 20 extending in stretched condition between the panes. The design of the compound window 13 will be described later in connection with FIGS. 2 and 3.

The floor 12 in the embodiment according to FIG. 1 has a layer of thick floor slabs 21 having a high density and a good thermal conductivity, for example, artificial stone slabs, terrazzo slabs or the like. The floor slabs 21 are mounted with good thermal conductivity to the bed 22 which also has good thermal conductivity and which may be, for example, of concrete with a plurality of embedded elements 23 for supplying and removing heat.

The elements 23 may be, for example, electric heater elements to supply to the floor slabs 21 with heat in an amount controlled by the flowing electrical current. Preferably the elements 23 are hollow channels or a tube system capable of conducting a heating or cooling medium. In the last mentioned case a liquid circuit is provided by arranging a thermally insulated tank 24 outside of the building and connected by a feed pipe 25 and a discharge pipe (not shown in FIG. 1) to the tube system 23. Per example a water circuit may be used, the water being heated to a suitable temperature higher than 24° C. in the winter or cooled below a temperature of 24° C. in the summer. In such a manner the floor is used to supply or to remove heat. Instead of water $CCl_3F$ (trade name Freon 11) may be used in the liquid circuit with a sub-pressure in the tube system of such value that the medium is condensed at a temperature exceeding 240° C.

For a room of the above-described design it would not be necessary to cover the surfaces of the walls and the ceiling exposed to the room with special layers. The equalizing effect of the heat being stored in the indoor structure maintains desirable temperature conditions in such a room with a fraction of the heating and cooling energy demand hitherto necessary. It is also possible to provide the outer wall 10 at its inner surface, with a thermal insulating cover 26 and thereupon a layer 27 being highly reflective for heat radiations in the range of 300° K. A corresponding insulation cover 28 and heat reflecting layer 29 may also be provided at the ceiling. Also, the back wall 11 may be provided with a heat reflecting layer 30, which may be carried by a thermal insulating cover. The insulation cover 26, 28 may be made of plastic foam and preferably bright rolled aluminum foil is used as the heat reflecting layers 27, 29 and 30.

An embodiment of a compound window 13 mentioned above is shown in detail in FIG. 2 and comprises eight thin transparent foils 20 stretched wrinkle-free and plane-parallel to each other between the inner and the outer window panes 18 and 19, respectively. The foils 20 must be stable to light and are made of polyethylene or polyethylene-terephthalate having a thickness of about 6 microns. Two of the foils 20 are fixed to opposite flat portions of rectangular frames 31 each made of four flat metal rods 4 mm. thick welded together at the corners. Four of such frames 31 each provided with one foil 20 on each flat side are stacked with thermal insulating spacing strips 32 between adjacent frames 31 and between the inner pane 18 and the first frame 31 as well as between the outer pane 19 and the fourth frame 31. The insulating strips may be made of plastics, cork or other suitable materials having, preferably, about the same thickness as the frame rods 31. Such a compound window defines, when clamped together by the outer frame 17, nine gas tight intermediate spaces between the inner and the outer window panes 18 and 19, which may be filled with dry gas preferably of less thermal conductivity than air, for example, carbon dioxide.

FIG. 3 shows another embodiment of a compound window 13 comprising six thin foils 20 between the inner and outer window panes 18 and 19, each foil being fixed to the flat margins 34 of a rectangular frame 33, bent into the illustrated stepped shape. The whole frame 33 fixed to both windowpanes 18 and 19 may be furnished with an outer frame (not shown).

The embodiments of compound windows 13 shown in FIGS. 2 and 3 comprise six or eight foils 20 between the windowpanes 18 and 19. It is pointed out that at least four foils are necessary for a compound window 13 suitable for a room designed according to the teachings of the present invention.

The thin polyethylene-terephthalate foils 20 extending between the two windowpanes 18 and 19 are less absorptive for visible light than glass panes of the same thickness, but the reflection coefficient in the infrared wavelength range of 3.5 to 35 microns is not as high as would be desirable. It would be preferred to use foils of a material or coated with a suitable material to get a reflection and an absorption coefficient for heat radiations of about 300° K. similar to glass. A compound window comprising layers (including the outer and inner panes) shows a thermal conductivity $L_\nu$ which is $$\frac{1}{\nu-1}$$

times smaller than the conductivity $L_2$ of a normal double pane window. At the same time the transparency $\tau_\nu$ for sun and sky light is reduced due to reflection by the surfaces of the absorption free layers having a refraction index of $n$ to the value $$\tau_\nu = \frac{1-r}{1+(2-1)r}$$

wherein $$r = \left(\frac{n-1}{n-1}\right)^2$$

is the reflection coefficient effecting the reflection of the light impinging upon the foil surfaces. The value of $\tau_\nu$ is shown in FIG. 4 as a function of the number $\nu$ of layers by vertical lines.

It is pointed out that owing to the brightening by multiple reflections and to the nearly complete transparency of each foil the relative transparency $\tau_\nu/2$ is less reduced with increasing number $\nu$ of layers than the relative thermal conductivity $L/L_2$ and the ratio $M$ between the two relative values increases with the number $\nu$ of layer according to $$M = \frac{\tau_\nu/\tau_2}{L_\nu/L_2} = (1-3r)\frac{\nu-1!}{1(2\nu-1)r}$$

Figure 4:
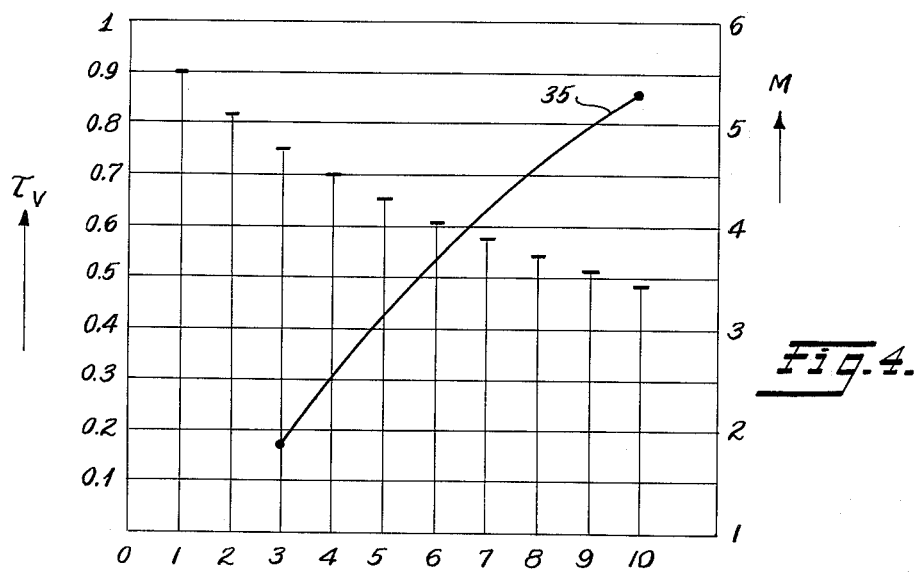

The ratio $M$ is shown in FIG. 4 as a function of the number $\nu$ of layers, as curve 35. It is seen that for a window according to FIG. 2 comprising eight foils i.e. having $\nu=10$ layers the ratio $M$ is about 5.3.

It is important to use windows having a ratio $M$ greater than unity because the heat demand of a room according to FIG. 1 is supplied in an increasing amount by the sun and sky radiation with an increasing ratio $M$. This is true because the main portion of the radiation penetrating the window is absorbed in the room and converted to heat which may be discharged through the window in decreasing amount with decreasing heat conductivity.

The heat flow through the interspace between two adjacent foils is caused by the thermal conductivity $L_G$ of the gas as well as by the heat transfer due to thermal convection $L_K$ and by heat radiation exchange $L_S$ between the adjacent surfaces. The thermal conductivity $L_G$ is a function of the specific conductivity $\lambda_G$ of the gas and the distance $d_G$ between adjacent foils according to $$L_G = \frac{\lambda_G}{d_G}$$

The factor $L_S$ is computable with the equation $$L_S = 4E\sigma(T_{12})^3$$

wherein:

$E$=the effective emissivity of a pair of foils having the single emissivities $E_1$ and $E_2$ to be evaluated from $1:(1/E_1+1/E_2-1)$;

$\sigma$=the Stefan-Boltzmann coefficient being $4.96 \cdot 10^{-8}$ kcal./m.² per hour per (° C.)⁴;

$T_{12}$=the average temperature of two adjacent foils.

Assuming an average temperature $T_{12}$ of 10° C. between adjacent foils, FIG. 5 shows as line 36 the values of $L_S$ plotted against different values of $E$.

The straight line 37 corresponds to the values $L_S+L_G+L_K$ measured and published by U.S. Bureau of Standards for a temperature difference $T_1-T_2=5.5$° C. It is easy to show that the factor $L_K$ is negligible in the case where the distance $d_G$ between adjacent foils being 1.9 cm. or less. For a distance $d_G$ more than 1.9 cm. and a higher temperature difference $T_1-T_2$ the influence of $L_K$ is remarkable as shown by the line 38 measured with $T_1-T_2=16.6$° C. Using six foils or more in a compound window of the described design having a distance less than 1.9 cm. between adjacent surfaces, the factor $L_K$ may be neglected.

To reduce the influence of the factor $L_G$ a suitable dry gas may be placed in the interspaces between the foils, for example $CO_2$. Assuming a distance $d_G$ of 4.5 mm. between adjacent foils and $E_1=E_2=0.90$ or $E=0.82$ a compound window comprising eight foils between the two panes ($\nu=10$) has a total thermal conductivity $L$ of about 0.703 kcal. per square meter per hour per ° C. corresponding to about 0.82 watt per square meter per ° C. Such a compound window has a thickness of about $9 \cdot 4.5 = 40.5$ mm. between the inside faces of the two panes.

What I claim is:

1. A structure comprising: means defining a room provided with at least one light transmitting window, said means comprising parts defining walls, a floor, and ceiling; all of said parts which are in position to receive radiant energy entering said window being of such material that they have a large heat storing capacity and good thermal conductivity, all said heat storing parts being connected in good heat conducting relation to each other, and means thermally insulating all said parts from the exterior surroundings; said window comprising spaced inner and outer transparent rigid panes, and a plurality of spaced transparent plastic foils in the space between said panes and extending across the area of said window.

2. A structure as defined in claim 1 wherein said foils are of a plastic material having a coefficient of extinction of higher value for infrared radiation than for visible light.

3. A structure as defined in claim 1 wherein said foils are of a plastic material having a coefficient of refraction of higher value for infrared radiation than for visible light.

References Cited by the Examiner

UNITED STATES PATENTS

| | | | |
|---|---|---|---|
| 2,207,656 | 7/1940 | Cartwright et al. | 126—270 X |
| 2,553,302 | 5/1951 | Cornwall | 126—271 X |
| 2,595,905 | 5/1952 | Telkes | 237—1 |
| 3,000,375 | 9/1961 | Golay | 126—270 |

OTHER REFERENCES

Solar House Publication by F. W. Hutchinson, Progressive Architecture, May 1947, pages 90 to 94 relied upon.

FREDERICK L. MATTESON, JR., *Primary Examiner.*

EDWARD J. MICHAEL, *Examiner.*